(12) United States Patent
Miyauchi et al.

(10) Patent No.: US 7,147,951 B1
(45) Date of Patent: Dec. 12, 2006

(54) COGENERATION DEVICE

(75) Inventors: Shinji Miyauchi, Nara (JP); Akinari Nakamura, Katano (JP); Yoshiaki Yamamoto, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 10/130,762

(22) PCT Filed: Nov. 16, 2000

(86) PCT No.: PCT/JP00/08070

§ 371 (c)(1),
(2), (4) Date: May 20, 2002

(87) PCT Pub. No.: WO01/37361

PCT Pub. Date: May 25, 2001

(30) Foreign Application Priority Data

Nov. 18, 1999 (JP) .............................. H11-327981

(51) Int. Cl.
*H01M 8/04* (2006.01)
*H01M 8/18* (2006.01)

(52) U.S. Cl. ............................ 429/26; 429/20; 429/19; 429/30; 429/24

(58) Field of Classification Search ................ 429/20, 429/26, 19, 30, 24
See application file for complete search history.

(56) References Cited

U.S. PATENT DOCUMENTS 5,344,721 A * 9/1994 Sonai et al. .................. 429/20

6,162,554 A * 12/2000 Nolscher et al. .............. 429/13
2002/0172846 A1* 11/2002 Hagan et al. .................. 429/20
2003/0031900 A1* 2/2003 Tajima et al. ................. 429/19

FOREIGN PATENT DOCUMENTS

| JP | 05-225993 | | 9/1993 |
|---|---|---|---|
| JP | 05-343084 | | 12/1993 |
| JP | 09-35733 | | 2/1997 |
| JP | 10-185313 | | 7/1998 |
| JP | 11-97044 | | 4/1999 |
| JP | 11-097044 | * | 4/1999 |
| JP | 11-132105 | | 5/1999 |
| JP | 11-223385 | | 8/1999 |
| JP | 2000-030726 | | 1/2000 |
| JP | 2000-294264 | | 10/2000 |
| JP | 2000-340244 | | 12/2000 |

OTHER PUBLICATIONS

Japanese search report for PCT/JP00/08070 dated Mar. 6, 2001.
English translation of Form PCT/ISA/210.

* cited by examiner

*Primary Examiner*—Patrick Joseph Ryan
*Assistant Examiner*—Angela J. Martin
(74) *Attorney, Agent, or Firm*—RatnerPrestia

(57) ABSTRACT

A cogeneration apparatus including a polymer electrolyte fuel cell that generates electric power using a fuel gas and oxidizing gas; an internal circulation circuit that circulates an internal heat transport medium into the fuel cell; internal circulating means of circulating the internal heat transport medium; first heat exchanging means of exchanging heat of the internal heat transport medium with an external heat transport medium; a fuel cell main unit that incorporates the fuel cell, the internal circulation circuit, the internal circulating means and the first heat exchanging means; and heat utilizing means of utilizing heat of the external heat transport medium heat-exchanged by the first heat exchanging means through waste heat collecting pipes.

5 Claims, 5 Drawing Sheets

COGENERATION DEVICE

CROSS-RELATED APPLICATIONS

THIS APPLICATION IS A U.S. NATIONAL PHASE APPLICATION OF PCT INTERNATIONAL APPLICATION PCT/JP00/08070.

TECHNICAL FIELD

The present invention relates to a cogeneration apparatus that generates electric power and supplies heat using a polymer electrolyte fuel cell.

BACKGROUND ART

A power generator using a conventional polymer electrolyte fuel cell will be explained below by using a block diagram in FIG. 5. In FIG. 5, reference numeral 1 denotes a fuel cell section and a fuel processing apparatus 2 performs steam reforming on raw materials such as natural gas, generates a gas whose main component is hydrogen and supplies the gas to the fuel cell 1. The fuel processing apparatus 2 is provided with a reformer 3 that generates a reformed gas and a carbon monoxide transformer 4 that allows carbon monoxide contained in the reformed gas to react with water to form carbon dioxide and hydrogen. A fuel side humidifier 5 humidifies a fuel gas to be supplied to the fuel cell 1. Reference numeral 6 denotes an air feeder that supplies air of an oxidizer to the fuel cell 1. At this time, an oxidation side humidifier 7 humidifies the supplied air. The power generator is further provided with a cooling pipe 8 through which water is sent to the fuel cell 1 for cooling, a pump 9 that circulates water in the cooling pipe and a radiator unit 10 for cooling that dissipates heat generated in the fuel cell 1 to the outside.

When power is generated using such an apparatus, water is circulated by the pump 9 through the cooling pipe 8 to keep temperature of the fuel cell 1 constant and heat generated in the fuel cell 1 is dissipated to the outside by the radiator unit 10 for cooling.

However, the above-described conventional configuration dissipates heat generated in the fuel cell 1 to the outside using the heat dissipation fan including a radiator unit 10 for cooling, and therefore cannot utilize heat generated during power generation, which results in a problem of failing to construct a cogeneration apparatus.

The conventional configuration also has a problem that it is unable to utilize waste heat of waste air or waste fuel gas after reaction in the fuel cell 1.

Furthermore, when power is generated using a cogeneration apparatus that generates a fuel gas from raw materials such as natural gas, the reformed gas after being transformed by the carbon monoxide transformer 4 contains a small quantity of carbon monoxide as remains. In such a situation, it is necessary to operate the apparatus within a predetermined temperature range in order to prevent the polymer electrolyte fuel cell 1 from being poisoned with carbon monoxide. However, the above-described power generator has no means of adjusting water temperature of the cooling circuit; therefore, it has problems that it is difficult to adjust temperature of the fuel cell 1, such as maintaining temperature of the fuel cell 1 during a low load operation and difficult to maintain performance of the fuel cell 1.

DISCLOSURE OF THE INVENTION

It is an object of the present invention to solve the above-described problems of the conventional technology.

To solve the above-described problems, one aspect of the present invention is a cogeneration apparatus, comprising:

a polymer electrolyte fuel cell that generates electric power using a fuel gas and an oxidizing gas;

an internal circulation circuit that circulates an internal heat transport medium through said fuel cell;

internal circulating means of circulating said internal heat transport medium;

first heat exchanging means of exchanging heat of said internal heat transport medium with an external heat transport medium;

a fuel cell main unit that incorporates said fuel cell, said internal circulation circuit, said internal circulating means and said first heat exchanging means; and heat utilizing means of utilizing heat of the external heat transport medium heat-exchanged by said first heat exchanging means through a waste heat collecting pipe.

The above-described configuration makes it possible to circulate heat produced by power generation of the fuel cell by an internal heat transport medium through the internal circulating means during operation of the cogeneration apparatus and transfer waste heat converted by the heat exchanging means to the external heat utilizing means. In this case, since the fuel cell main unit incorporates the heat exchanging means, in comparison with a configuration whereby the internal circulation circuit and heat exchanging means are led to the external heat utilizing means, one of the waste heat collecting pipes, that is, the pipe from the heat utilizing means to the heat exchanging means serves as the pipe on the normal low temperature side and if the internal heat transport medium of the internal circulation circuit is a polymer electrolyte fuel cell, temperature ranges from 70 to 80° C., and therefore it is possible to reduce heat loss and improve the waste heat collection efficiency compared to the case where the piping of the internal circulation circuit of this internal heat transport medium is extended. Furthermore, since the internal circulation circuit itself of the internal heat transport medium can be constructed as a shorter circuit inside the fuel cell main unit, it is possible to reduce the total amount of the internal heat transport medium that flows through the internal circulation circuit of the internal heat transport medium, use a non-freezing solution, etc. as the internal heat transport medium and use water as the external heat transport medium in the waste heat collecting pipe connecting the fuel cell and heat utilizing means, etc. and thereby construct a more economical system.

Further, to solve the above-described problems, the present invention according to claim 2 is the cogeneration apparatus according to claim 1, comprising:

second heat exchanging means of exchanging heat of waste gas after chemical reaction of said oxidizing gas and/or fuel gas in said fuel cell, with an external heat transport medium at the side of upstream of said waste heat collecting pipe of said first heat exchanging means, and said second heat exchanging means is incorporated in said fuel cell main unit.

The above-described configuration first of all allows the second heat exchanging means to perform heat exchange for waste heat on the air side of the fuel cell with relatively low temperature and then allows the first heat exchanging means to perform heat exchange for waste heat of the internal heat transport medium on the high temperature side, which makes it possible to further improve the utilization efficiency of waste heat transferred to the heat utilizing means.

Further, to solve the above-described problems, another aspect of the present invention is the cogeneration apparatus, wherein said external heat transport medium is water, said heat utilizing means is a hot water storage tank, hot water from said waste heat collecting pipe is led to the upper side of said hot water tank, hot water is led from the lower side of said hot water storage tank to said waste heat collecting pipe, said cogeneration apparatus further comprises:

external heat transport medium circulating means in a path of said waste heat collecting pipe, and stored hot water controlling means of storing hot water having higher temperature in the upper side of said hot water tank than the lower side by controlling a flow rate of said external heat transport medium circulating means.

The above-described configuration makes it possible to control the flow rate of the external heat transport medium circulating means, allow the hot water controlling means of storing hot water from the upper part of the hot water tank in a multilayer form to always store hot water from the upper part of the hot water tank in a multilayer form, secure the stored hot water at a high temperature (60 to 80° C.) in a normal piping configuration whereby the hot water feeding pipe is taken out of the top of the hot water tank and secure a minimum necessary amount of hot water stored in a short time even if the total amount of the hot water tank is exhausted. Therefore, it is possible to obtain hot water at a usable temperature in a short time compared to the case where the temperature of a thankful of water is increased across the board.

Further, to solve the above-described problems, still another aspect of the present invention is the cogeneration apparatus, further comprising:

temperature detecting means of detecting a temperature of said internal heat transport medium; and fuel cell cooling water temperature controlling means of keeping the temperature of said internal heat transport medium to a predetermined temperature, by adjusting the amount of heat exchange from said first heat exchanging means by adjusting the flow rate of said external heat transport medium circulating means, with the detected temperature.

In the above-described configuration, the first heat exchanging means divides the internal circulation circuit from the external heat utilizing means, and therefore this configuration prevents drastic changes of heat load produced from the external heat utilizing means or drastic changes of heat load produced by variations of the amount of external heat transport medium from affecting the internal circulation circuit, which makes it possible to operate the fuel cell within a predetermined temperature range, prevent poisoning with carbon monoxide and maintain its performance. Furthermore, when heat generated during power generation of the fuel cell is dissipated to cool down the fuel cell, it is possible for the heat exchanging means of the internal circulation circuit and the fuel cell cooling water controlling means to adjust the amount of hot water in the waste heat collecting pipe to be heat-exchanged through the flow rate of the external heat transport medium circulating means, keep the temperature of the internal heat transport medium to be supplied to the fuel cell at a predetermined temperature and prevent the performance of the fuel cell from deteriorating due to poisoning with carbon monoxide.

Figure 1:
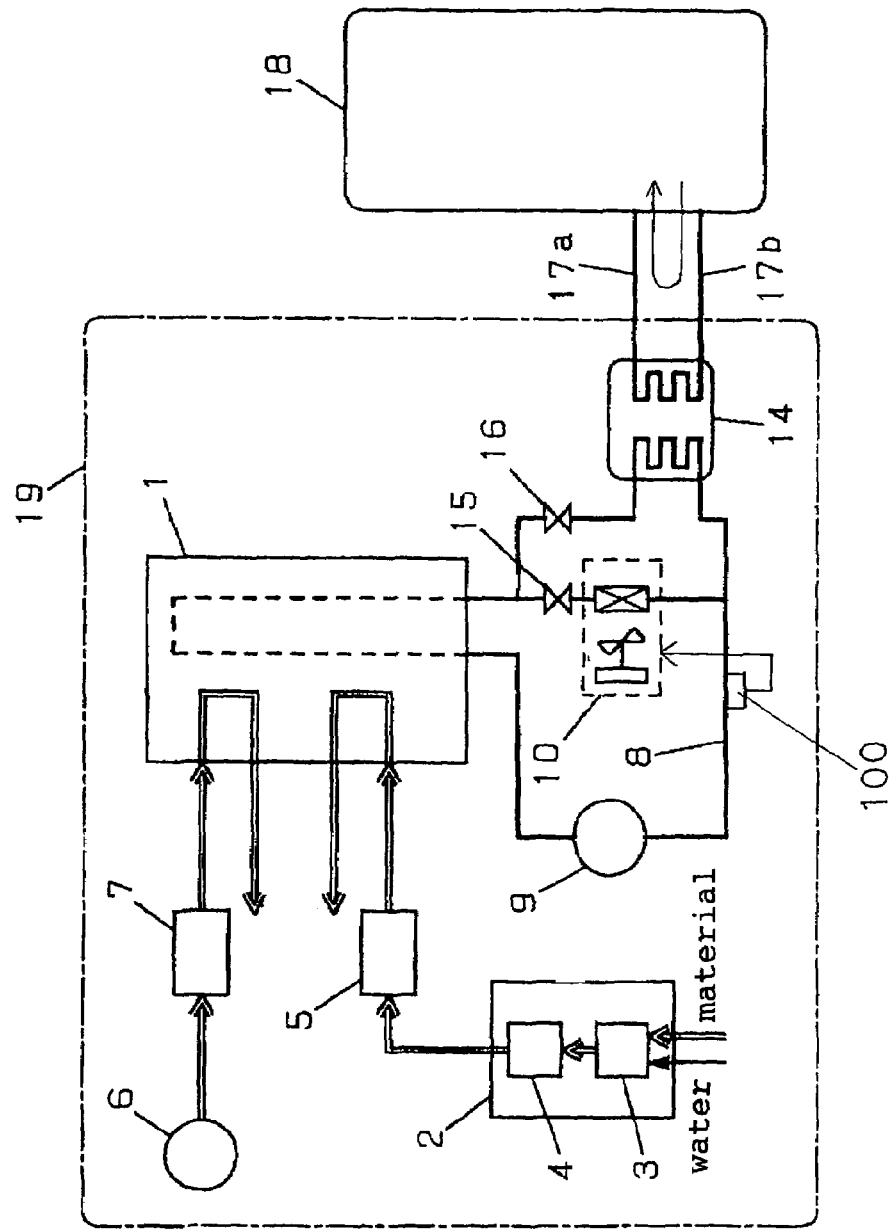
FIG. 1 is a block diagram of a cogeneration apparatus, which is an embodiment of the present invention.

1 fuel cell
2 fuel processor
3 reformer
4 carbon monoxide transformer
5 fuel side humidifier
6 air feeder
7 oxidation side humidifier
8 cooling pipe
9 pump
10 radiator
14 first heat exchanging means
15, 16 flow rate adjustment valve
17a, 17b waste heat collecting pipe
18 heat utilizing means
19 fuel cell main unit
21 second heat exchanging means
31 external circulation pump
32 hot water thermistor
33 hot water controlling means
39 heat utilizing means (hot water tank)
41 internal heat transport medium thermistor
42 fuel cell cooling water temperature controlling means

BEST MODE FOR CARRYING OUT THE INVENTION

With reference now to the attached drawings, specific embodiments of the present invention will be explained below.

EMBODIMENT 1

FIG. 1 is a block diagram of a cogeneration apparatus, which is an embodiment of the present invention. The cogeneration apparatus has a gas system necessary for power generation of the fuel cell 1, which is constructed of a polymer electrolyte fuel cell 1 that generates electric power using a fuel gas and oxidizing gas, a fuel processor 2 that generates a fuel gas by reforming a raw material fuel with steam and transforming carbon monoxide thereof, a fuel side humidifier 5 that humidifies the fuel gas to be supplied to the fuel cell 1, an air feeder 6 that supplies air of an oxidizer to the fuel cell 1 and an oxidation side humidifier 7 that humidifies the supplied air. The fuel processor 2 is constructed of a reformer 3 that reforms a raw material fuel with steam to generate a reformed gas whose main component is hydrogen and a carbon monoxide transformer 4 that transforms carbon monoxide contained in the reformed gas and supplies the transformed product as a fuel gas to the fuel cell 1.

Furthermore, the internal heat transfer system that sends an internal heat transport medium to the fuel cell 1 and adjusts the temperature of the fuel cell 1 is constructed of a cooling pipe 8, a pump 9 that circulates the internal heat transport medium in the cooling pipe 8, a radiator unit 10 that dissipates heat generated in the fuel cell 1 to the outside, first heat exchanging means 14 that exchanges heat of the internal heat transport medium flowing through the cooling pipe 8 with the external heat transport medium, flow rate adjustment valves 15 and 16 as the flow rate adjusting means of adjusting the flow rate of the internal heat transport medium that flows through the radiator unit 10 and the first heat exchanging means 14, and heat utilizing means 18 that utilizes heat of the external heat transport medium whose heat is exchanged by the first heat exchanging means 14 through waste heat collecting pipes 17a and 17b. Furthermore, the fuel cell main unit 19 incorporates the fuel cell 1, the internal circulation circuit 8, the pump 9, which is the internal circulating means, and the first heat exchanging means 14.

Figure 5:
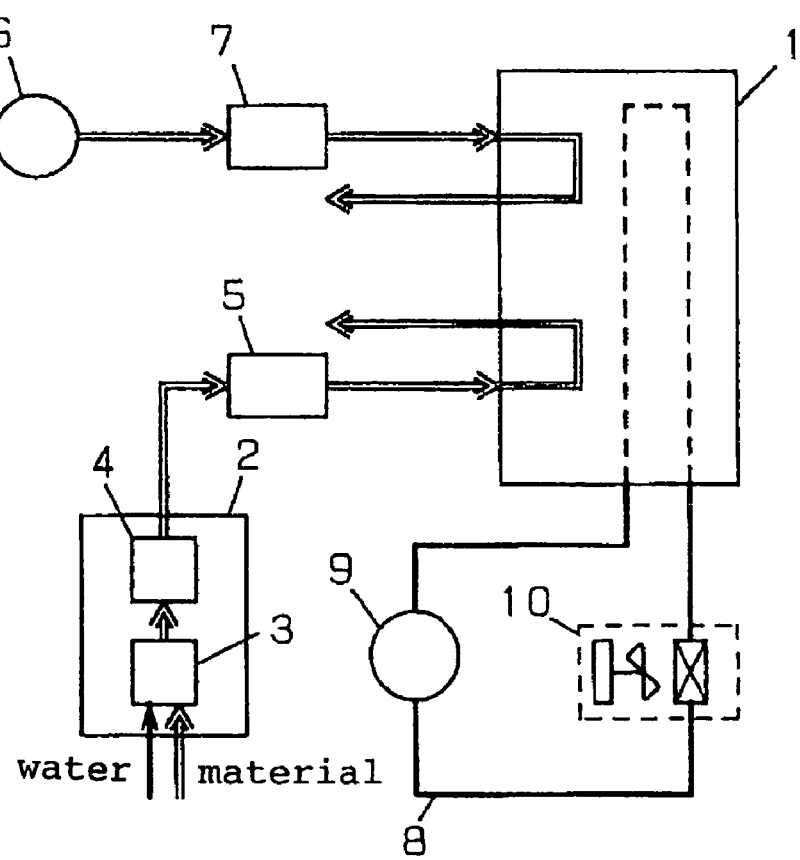
FIG. 5 is a block diagram of a power generator using a conventional polymer electrolyte fuel cell.

The above-described components that have the same functions as those of the conventional power generator shown in FIG. 5 assigned the same reference numerals and suppose details of those functions conform to those of the conventional power generator shown in FIG. 5. Furthermore, the cooling pipe 8, the pump 9, the radiator unit 10, the first heat exchanging means 14 and the flow rate adjustment valves 15 and 16 construct the internal circulation circuit of this embodiment.

During operation of the cogeneration apparatus, the flow rate adjustment valve 15 is closed, the flow rate adjustment valve 16 is left open, heat produced by power generation of the fuel cell is circulated by the internal heat transport medium through the pump 9 and the heat is transferred to the external heat transport medium using the first heat exchanging means 14. The heat utilizing means 18 utilizes heat exchanged with the external heat transport medium by its internal pumping means (not shown) through the waste heat collecting pipes 17a and 17b. For the heat utilizing means, a hot water panel as a heating apparatus or a hot water storage tank as a hot water supply system, etc. are used. In this case, since the first heat exchanging means 14 is incorporated in the fuel cell main unit 19, the path can be shortened and the amount of the internal heat transport medium that flows through the internal circulation circuit can be reduced compared to the amount of the external heat transport medium. As a result, when a hot water tank is used as the heat utilizing means 18, non-freezing solution is used as the internal heat transport medium and water is used as the external heat transport medium, it is possible to reduce the total amount of the non-freezing solution and construct a more economical system. Furthermore, of the waste heat collecting pipes 17a and 17b, the waste heat collecting pipe 17b that runs from the heat utilizing means (hot water tank) 18 to the first heat exchanging means 14 is normally the (water) pipe on the low temperature side, and the temperature of the internal heat transport medium that flows through the internal circulation circuit is 70 to 80° C. in the case of the fuel cell 1 is a polymer electrolyte fuel cell, and therefore it is possible to reduce heat loss compared to the case where the cooling pipe 8 of the internal heat transport medium is extended and the first heat exchanging means is provided on the heat utilizing means 18 side, and improve the waste heat collection efficiency as the fuel cell.

Furthermore, when there is no need to collect waste heat of the cogeneration apparatus through the heat utilizing means 18, in order to dissipate heat generated from the fuel cell 1, the flow rate adjustment valve 15 is opened, the flow rate adjustment valve 16 is closed and the radiator unit 10 is activated, thus making it possible to exchange heat of the internal heat transport medium with external air and dissipate heat to the outside. At this time, the temperature of the internal heat transport medium can be controlled within a predetermined temperature range by controlling the performance of the radiator unit 10. For example, the radiator unit 10 can be controlled using a thermistor 100.

EMBODIMENT 2

Figure 2:
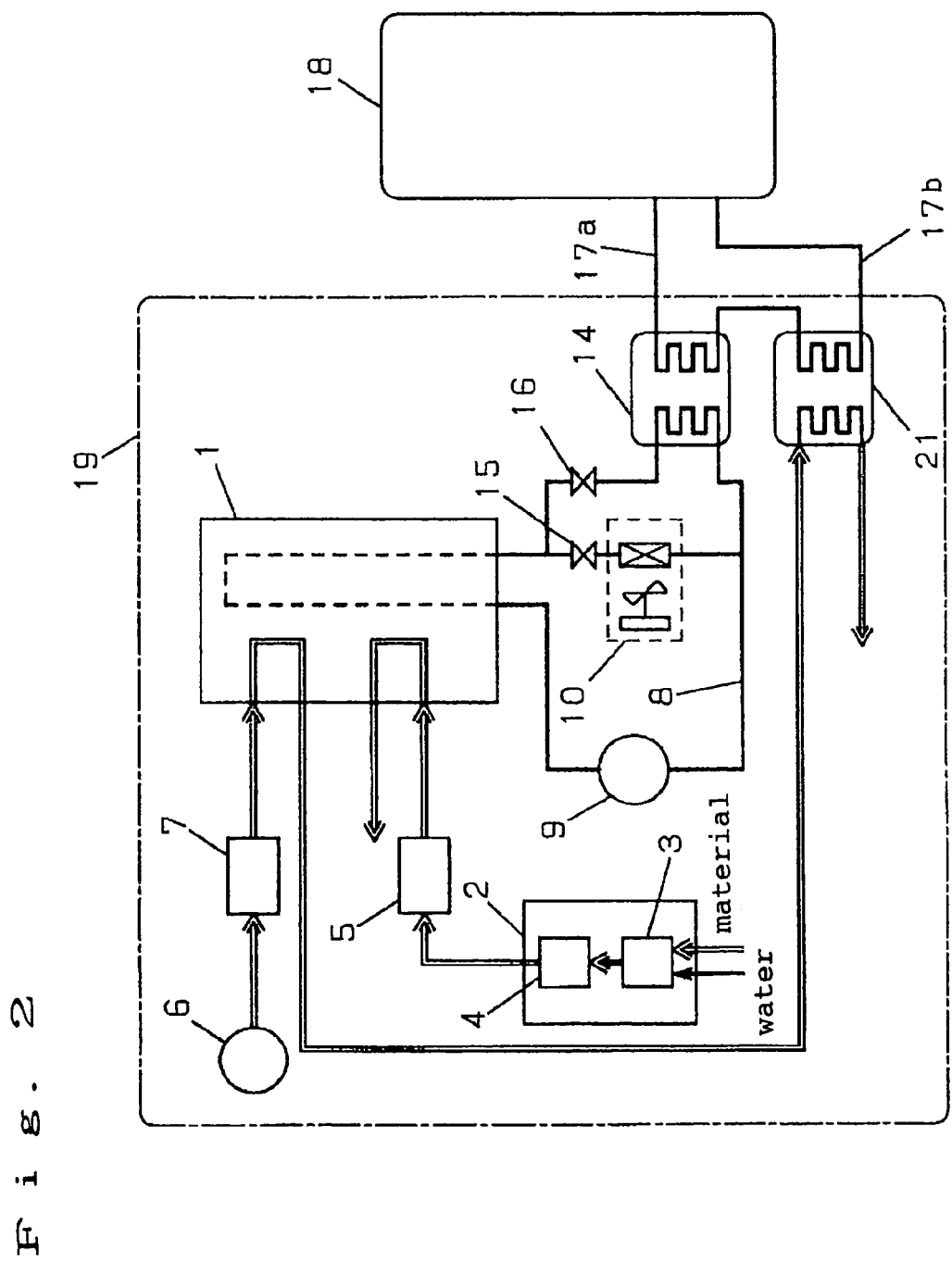
FIG. 2 is a block diagram of a cogeneration apparatus, which is another embodiment of the present invention.

FIG. 2 is a block diagram of a cogeneration apparatus, which is another embodiment of the present invention. The cogeneration apparatus has a gas system necessary for power generation of the fuel cell 1, which is constructed of a polymer electrolyte fuel cell 1 that generates electric power using a fuel gas and oxidizing gas, a fuel processor 2 that generates a fuel gas by reforming a raw material fuel with steam and transforming carbon monoxide thereof, a fuel side humidifier 5 that humidifies fuel gas to be supplied to the fuel cell 1, an air feeder 6 that supplies air of the oxidizer to the fuel cell 1, an oxidation side humidifier 7 that humidifies the supplied air, and second heat exchanging means 21 that exchanges heat of the oxidizer waste gas produced after chemical reaction of the humidified air 1 in the fuel cell 1 as the oxidizing gas supplied to the fuel cell. The fuel processor 2 is constructed of a reformer 3 that reforms a raw material fuel with steam to generate a reformed gas whose main component is hydrogen, and a carbon monoxide transformer 4 that transforms carbon monoxide contained in the reformed gas and supplies the transformed product as a fuel gas to the fuel cell 1.

Furthermore, the internal heat transfer system that sends an internal heat transport medium to the fuel cell 1 and adjusts the temperature of the fuel cell 1 is constructed of a cooling pipe 8, a pump 9 that circulates the internal heat transport medium in the cooling pipe 8, a radiator unit 10 that dissipates heat generated in the fuel cell 1 to the outside, a first heat exchanging means 14 that exchanges heat of the internal heat transport medium flowing through the cooling pipe 8 with that of the external heat transport medium, flow rate adjustment valves 15 and 16 as the flow rate adjusting means of adjusting the flow rate of the internal heat transport medium that flows through the radiator unit 10 and first heat exchanging means 14, and a heat utilizing means 18 that utilizes heat of the external heat transport medium whose heat is exchanged by the first heat exchanging means 14 through waste heat collecting pipes 17a and 17b. Furthermore, the fuel cell main unit 19 incorporates the polymer electrolyte fuel cell 1, the internal circulation circuit, the pump 9, which is the internal circulating means, the first heat exchanging means 14 and second heat exchanging means 21. The first heat exchanging means 14 is placed downstream side of the external heat transport medium circuit of the second heat exchanging means 21 to provide a configuration intended to improve heat utilization efficiency.

The above-described components that have the same functions as those of the conventional power generator shown in FIG. 5 are assigned the same reference numerals and suppose details of those functions conform to those of the conventional power generator shown in FIG. 5. Furthermore, the cooling pipe 8, pump 9, radiator unit 10, first heat exchanging means 14, and flow rate adjustment valves 15 and 16 construct the internal circulation circuit of this embodiment.

During operation of the cogeneration apparatus, first of all, the flow rate adjustment valve 15 is closed, the flow rate adjustment valve 16 is left open, and heat produced by power generation of the fuel cell 1 is circulated by the internal heat transport medium through the pump 9. Furthermore, the air feeder 6 supplies humidified air as an oxidizing gas to the fuel cell 1 gas through the oxidation side humidifier 7 that humidifies the supplied air, and the oxidizer side waste gas after chemical reaction with the fuel cell 1 is sent to the second heat exchanging means 21 for heat-exchange. The external heat transport medium sent from the waste heat collecting pipe 17b by the pumping means (not shown) inside the heat utilizing means 18 is heat-exchanged by the second heat exchanging means 21 first, then heat-exchanged with the internal heat transport medium sent by the pump 9 of the internal circulation circuit through the first heat exchanging means 14, and is sent to the heat utilizing means 18 through the waste heat collecting pipe 17a. For the heat utilizing means 18, a hot water panel as the heating apparatus or a hot water tank as a hot water supply system, etc. is used. In this case, since the second heat exchanging means 21 and the first heat exchanging means 14 are incorporated in the fuel cell main unit 19, the amount of the internal heat transport medium that flows inside the internal circulation circuit can be reduced compared to the amount of the external heat transport medium. When a hot water tank is used as the heat utilizing means 18, a non-freezing solution is used as the internal heat transport medium and water is used as the external heat transport medium, it is possible to reduce the total amount of the non-freezing solution and construct a more economical system. Furthermore, of the waste heat collecting pipes 17a and 17b, the waste heat collecting pipe 17b that runs from the heat utilizing means (hot water tank) 18 to the second heat exchanging means 21 is normally the (water) pipe on the low temperature side, and the temperature of the internal heat transport medium that flows through the internal circulation circuit is 70 to 80° C. in the case of the fuel cell 1 is a polymer electrolyte fuel cell, and therefore it is possible to reduce heat loss compared to the case where the cooling pipe 8 of the internal heat transport medium is extended, and improve the waste heat efficiency as the fuel cell.

Furthermore, when there is no need to collect waste heat of the fuel cell 1 through the heat utilizing means 18, in order to dissipate heat generated from the fuel cell 1, the flow rate adjustment valve 15 is left open, the flow rate adjustment valve 16 is closed and the radiator unit 10 is activated; thus making it possible to exchange heat of the internal heat transport medium with external air and dissipate heat to the outside.

Furthermore, the cogeneration apparatus according to this embodiment provided with the oxidation side humidifier 7 that supplies humidified air as an oxidizing gas to the fuel cell 1 and sends waste gas produced after chemical reaction with the fuel cell 1 to the second heat exchanging means 21 obtains humidified waste gas air at a waste gas temperature of 60 to 65° C. after chemical reaction with the fuel cell 1 during operation of the cogeneration apparatus, and when the second heat exchanging means 21 exchanges heat with water as the external heat transport medium, the temperature rises by approximately 15 to 20° C. when the flow rate of the external heat transport medium is set to approximately 0.048 to 0.060 m$^3$/h (approximately 0.8 to 1.0 L/min). After heat is exchanged using this second heat exchanging means 21, heat is further exchanged by the first heat exchanging means 14, and in this way the temperature of the external heat transport medium can be increased to near the circulation temperature (approximately 70 to 80° C.) of the internal heat transport medium. Therefore, waste heat utilization efficiency of the thermal-electric cogeneration apparatus has been further improved.

In this embodiment, the oxidizer side waste gas of the fuel cell is used as the heat source of the first heat exchanging means, and as a result, similar effects can also be achieved by providing the configuration using the fuel side waste gas of the fuel cell.

EMBODIMENT 3

Figure 3:
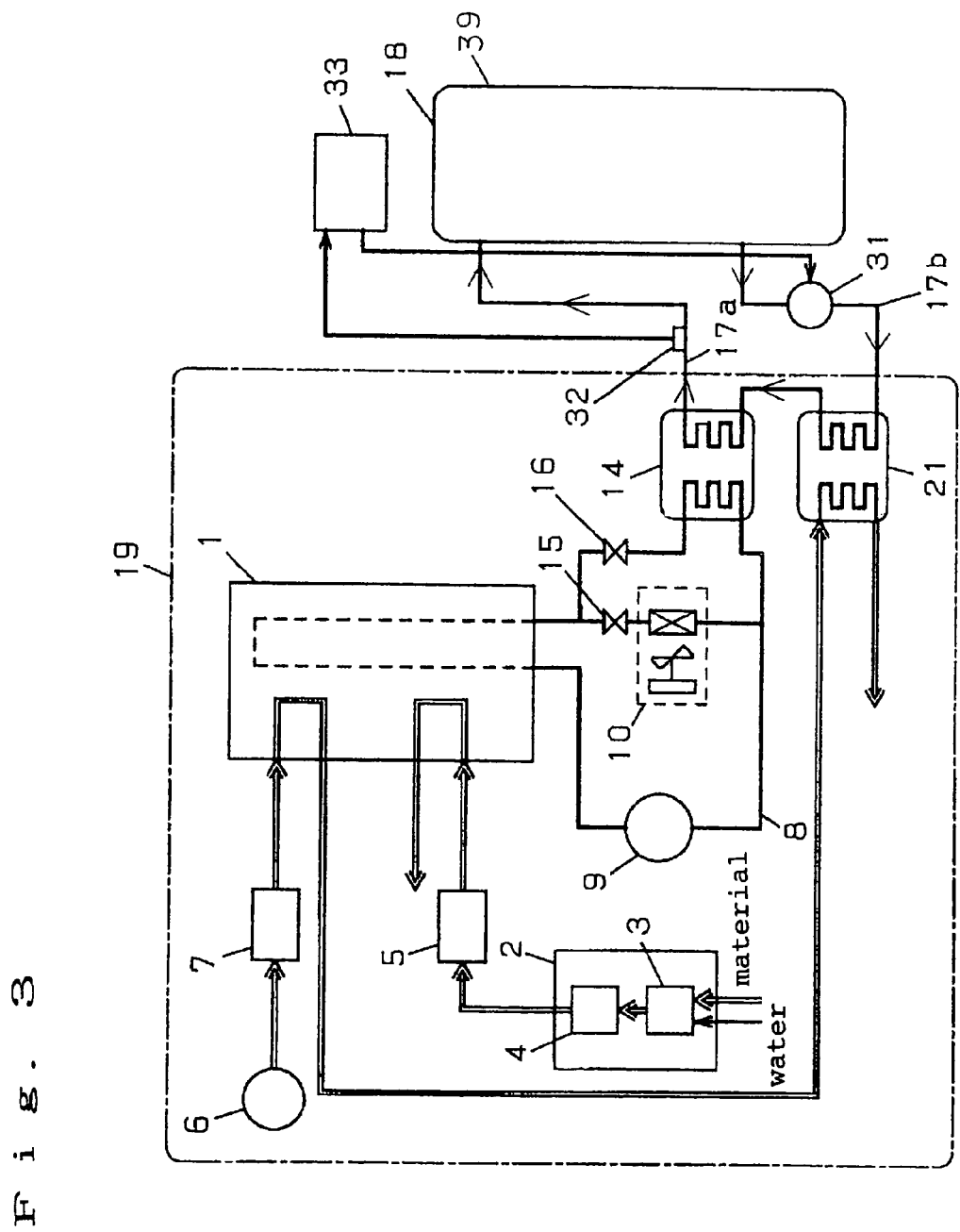
FIG. 3 is a block diagram of a cogeneration apparatus, which is a further embodiment of the present invention.

FIG. 3 is a block diagram of a cogeneration apparatus, which is another embodiment of the present invention. The cogeneration apparatus has a gas system necessary for power generation of the fuel cell 1, which is constructed of a polymer electrolyte fuel cell 1 that generates electric power using a fuel gas and oxidizing gas, a fuel processor 2 that reforms a raw material fuel with steam and transforms carbon monoxide thereof to generate a fuel gas, a fuel side humidifier 5 that humidifies the fuel gas to be supplied to the fuel cell 1, an air feeder 6 that supplies oxidizer air to the fuel cell 1, an oxidation side humidifier 7 that humidifies the supplied air, and a second heat exchanging means 21 that exchanges heat of the oxidizer side waste gas produced after chemical reaction of the humidified air in the fuel cell 1 as the oxidizing gas supplied to the fuel cell 1. The fuel processor 2 is constructed of a reformer 3 that reforms a raw material fuel with steam to generate a reformed gas whose main component is hydrogen, and a carbon monoxide transformer 4 that transforms carbon monoxide contained in the reformed gas and supplies the transformed product as a fuel gas to the fuel cell 1.

Furthermore, the internal heat transfer system that sends an internal heat transport medium to the fuel cell 1 and adjusts the temperature of the fuel cell 1 is constructed of a cooling pipe 8, a pump 9 that circulates the internal heat transport medium in the cooling pipe 8, a radiator unit 10 that dissipates heat generated in the fuel cell 1 to the outside, a first heat exchanging means 14 that exchanges heat of the internal heat transport medium flowing through the cooling pipe 8 with the external heat transport medium, flow rate adjustment valves 15 and 16 as the flow rate adjusting means of adjusting the flow rate of the internal heat transport medium that flows through the radiator unit 10 and first heat exchanging means 14, and a hot water tank 39 as heat utilizing means that utilizes heat of the external heat transport medium subjected to heat exchange by the first heat exchanging means 14 through waste heat collecting pipes 17a and 17b. This waste heat collecting pipe 17a is connected to the upper part of the hot water tank 39 and the waste heat collecting pipe 17b is connected to the lower part of the hot water tank 39.

The cogeneration apparatus is further constructed of an external circulation pump 31, which is attached to the waste heat collecting pipe 17b and sends water as an external heat transport medium to the second heat exchanging means 21, a hot water thermistor 32, which is attached to the waste heat collecting pipe 17a and functions as the temperature detecting means of detecting the temperature of hot water whose heat is exchanged by the first heat exchanging means 14, and a hot water controlling means 33 of controlling the flow rate of an external circulation pump 31 based on the temperature of hot water detected by the hot water thermistor 32.

Furthermore, the fuel cell main unit 19 incorporates the polymer electrolyte fuel cell 1, the internal circulation circuit, the pump 9, the first heat exchanging means 14 and the second heat exchanging means 21. The first heat exchanging means 14 is placed downstream side of the external heat transport medium circuit of the second heat exchanging means 21, which provides a configuration intended to improve heat utilization efficiency.

The above-described components that have the same functions as those of the conventional power generator shown in FIG. 5 are assigned the same reference numerals and suppose details of those functions conform to those of the conventional power generator shown in FIG. 5. Furthermore, the cooling pipe 8, pump 9, radiator unit 10, first heat exchanging means 14 and flow rate adjustment valves 15 and 16 construct the internal circulation circuit of this embodiment.

During operation of the cogeneration apparatus, the flow rate adjustment valve 15 is closed, the flow rate adjustment valve 16 is left open, heat produced by power generation of the fuel cell is circulated by the internal heat transport medium through the pump 9. Furthermore, the air feeder 6 supplies humidified air as an oxidizing gas to the fuel cell 1 through the oxidation side humidifier 7 that humidifies the supplied air, and the oxidizer side waste gas after chemical reaction with the fuel cell 1 is sent to the second heat exchanging means 21 where the oxidizer side waste gas is heat-exchanged. Water as the external heat transport medium sent from the heat utilizing means 39 through the pumping means 31 of the waste heat collecting pipe 17b is heat-exchanged through the first heat exchanging means 14 by the second heat exchanging means 21 first, then heat-exchanged with the internal heat transport medium sent by the pump 9 of the internal circulation circuit, and sent to the heat utilizing means 39 through the waste heat collecting pipe 17a. At this time, since the fuel cell main unit 19 incorporates the second heat exchanging means 21 and the first heat exchanging means 14, the system can be constructed with a smaller amount of the internal heat transport medium that flows through the internal circulation circuit than the amount of the external heat transport medium. When a non-freezing solution is used as the internal heat transport medium and water is used as the external heat transport medium, it is possible to reduce the total amount of the non-freezing solution and construct a more economical system. Furthermore, of the waste heat collecting pipes 17a and 17b, when the waste heat collecting pipe 17b from the hot water tank 39 to the second heat exchanging means 21 is the (water) pipe normally on the low temperature side, and the internal heat transport medium that flows through the internal circulation circuit of the fuel cell 1 is a polymer electrolyte fuel cell, temperature is 70 to 80° C., and therefore it is possible to reduce heat loss compared to the case where the cooling pipe 8 of the internal heat transport medium is extended and improve the waste heat collection efficiency.

Furthermore, the flow rate of the external circulation pump 31 that exchanges heat of water of the hot water tank 39 through the waste heat collecting pipes 17a and 17b is controlled based on the detected value of the hot water thermistor 32, and the hot water controlling means 33 of storing hot water in a multilayer form from the upper part of the hot water tank allows hot water to be stored from the upper part of the hot water tank 39 in a multilayer form, for example, two layers, always with the upper layer having high temperature and the lower layer having lower temperature. The normal piping configuration whereby the outlet of the hot water supply pipe is taken out of the upper part of the hot water tank 39 can secure high hot water storing temperature (60 to 80° C.) and secure a minimum necessary amount of hot water in a short time even if the total amount of the hot water tank is exhausted. Furthermore, it is also possible to experimentally, roughly control the flow rate without using the hot water thermistor 32.

Furthermore, when there is no need to collect waste heat of the cogeneration apparatus through the hot water tank 39, in order to dissipate heat generated in the fuel cell 1, the flow rate adjustment valve 15 is left open, the flow rate adjustment valve 16 is closed and the radiator unit 10 is activated, thus making it possible to exchange heat of the internal heat transport medium with external air and dissipate heat to the outside.

This embodiment uses an oxidizer side waste gas of the fuel cell as the heat source of the first heat exchanging means, but similar effects can also be obtained by providing a structure using the fuel side waste gas of the fuel cell.

Furthermore, since the heat exchanging means is constructed in such a way that heat of the oxidizer side waste gas after chemical reaction of humidified air in the fuel cell 1 as the oxidizing gas supplied to the fuel cell 1 is exchanged by the second heat exchanging means 21 first and then heat from the internal circulation circuit of the cooling system of the fuel cell 1 is exchanged by the heat exchanging means 14, heat exchange on the high temperature side is performed after heat exchange by the heat exchanging means on the low temperature side, and therefore the heat exchanging efficiency improves and the utilization efficiency of waste heat transferred to the heat utilizing means increases significantly.

EMBODIMENT 4

Figure 4:
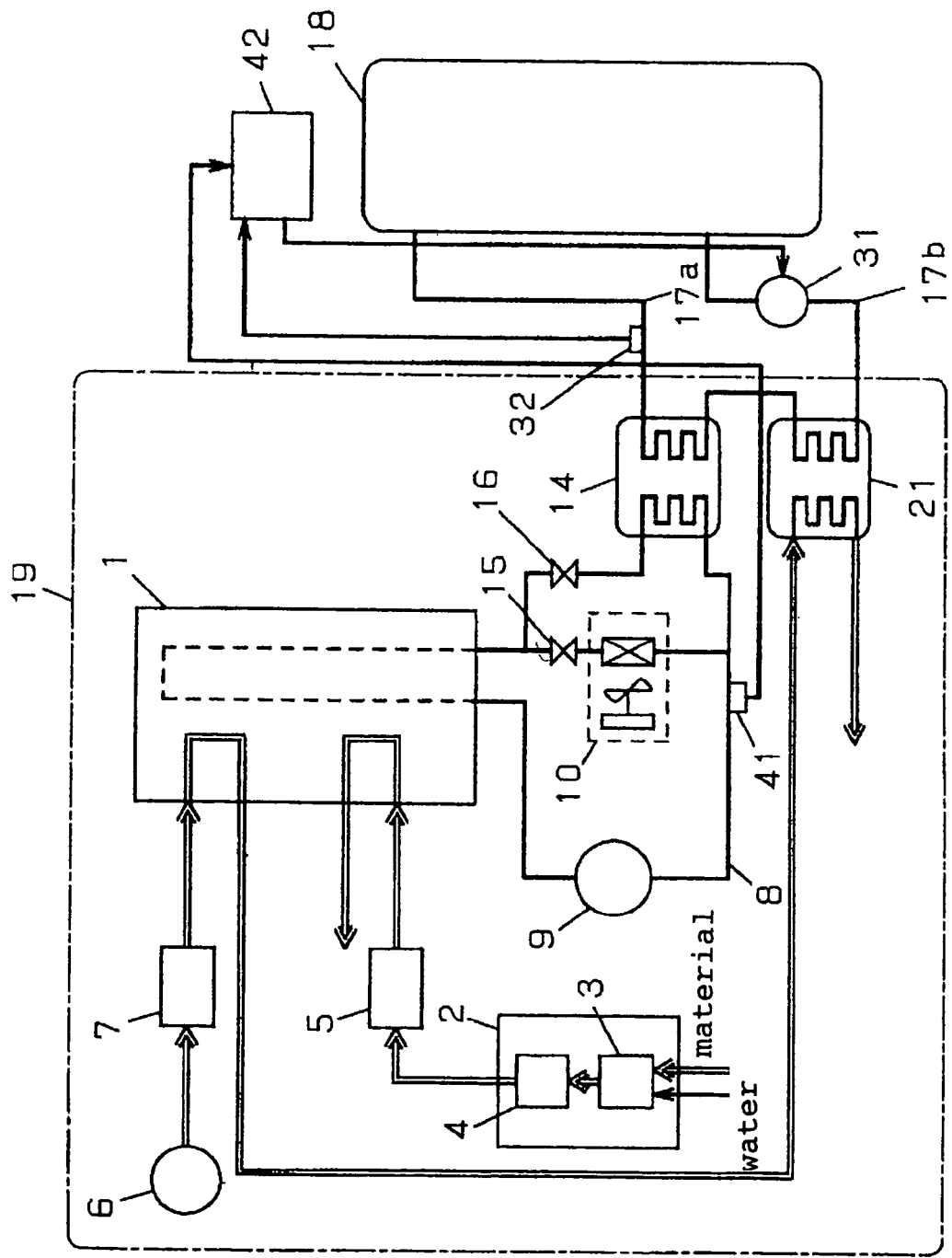
FIG. 4 is a block diagram of a cogeneration apparatus, which is a still further embodiment of the present invention.

FIG. 4 is a block diagram of a cogeneration apparatus, which is another embodiment of the present invention. The cogeneration apparatus has a gas system necessary for power generation of the fuel cell 1, which is constructed of a polymer electrolyte fuel cell 1 that generates electric power using a fuel gas and oxidizing gas, a fuel processor 2 that reforms a raw material fuel with steam and transforms carbon monoxide thereof to generate a fuel gas, a fuel side humidifier 5 that humidifies the fuel gas to be supplied to the fuel cell 1, an air feeder 6 that supplies oxidizer air to the fuel cell 1, an oxidation side humidifier 7 that humidifies the supplied air, and the second heat exchanging means 21 that exchanges heat of the oxidizer side waste gas after chemical reaction of the humidified air as the oxidizing gas supplied to the fuel cell 1 in the fuel cell 1. The fuel processor 2 is constructed of a reformer 3 that reforms a raw material fuel with steam to generate a reformed gas whose main component is hydrogen, and a carbon monoxide transformer 4 that transforms carbon monoxide contained in the reformed gas and supplies the transformed product as a fuel gas to the fuel cell 1.

Furthermore, the internal heat transfer system that sends an internal heat transport medium to the fuel cell 1 and adjusts the temperature of the fuel cell 1 is constructed of a cooling pipe 8, a pump 9 that circulates the internal heat transport medium in the cooling pipe 8, a radiator unit 10 for cooling that dissipates heat generated in the fuel cell 1 to the outside, a first heat exchanging means 14 that exchanges heat of the internal heat transport medium flowing through the cooling pipe 8 with the external heat transport medium, flow rate adjustment valves 15 and 16 as the flow rate adjusting means of adjusting the flow rate of the internal heat transport medium that flows through the radiator unit 10 and first heat exchanging means 14, and an internal heat transport medium thermistor 41 as the temperature detecting means attached to the outlet side of the internal circulation circuit of the first heat exchanging means 14. Then, the waste heat collection circuit is constructed of heat utilizing means 39 of utilizing heat of the external heat transport medium heat-exchanged by the first heat exchanging means 14 through the waste heat collecting pipes 17a and 17b, an external circulation pump 31 attached to the waste heat collection pipe 17b, that sends water as the external heat transport medium to the first heat exchanging means 14, a hot water thermistor 32 as the temperature detecting means attached to the waste heat collecting pipe 17a, that detects the temperature of hot water heat-exchanged by the first heat exchanging means 14, and the second heat exchanging means 21 provided at the upstream side of the first heat exchanging means 14, that collects heat of the oxidizer side waste gas. Then, fuel cell cooling water temperature controlling means 42 is constructed in such a way as to control the flow rate of the external circulation pump 31 based on the hot water temperature detected by the internal heat transport medium thermistor 41 and control the temperature of the internal heat transport medium to be supplied to the fuel cell 1 to a predetermined temperature (approximately 70 to 80° C.). Furthermore, the polymer electrolyte fuel cell 1, the pump 9, which is the internal circulation circuit and the internal circulating means, the first heat exchanging means 14 and the second heat exchanging means 21 are incorporated in the fuel cell main unit 19.

The above-described components that have the same functions as those of the conventional power generator shown in FIG. 5 are assigned the same reference numerals and suppose details of those functions conform to the conventional power generator shown in FIG. 5. Furthermore, the cooling pipe 8, pump 9, radiator unit 10, first heat exchanging means 14 and flow rate adjustment valves 15 and 16 construct the internal circulation circuit of this embodiment.

During operation of the cogeneration apparatus, first of all the flow rate adjustment valve 15 is closed, the flow rate adjustment valve 16 is left open, and heat produced by power generation of the fuel cell 1 is circulated using the internal heat transport medium through the pump 9. Furthermore, the air feeder 6 supplies humidified air as the oxidizing gas to the fuel cell 1 through the oxidizer side humidifier 7 that humidifies the supplied air and the oxidizer side waste gas after chemical reaction with the fuel cell 1 is sent to the second heat exchanging means 21 where the oxidizer side waste gas is heat-exchanged. First of all, the water sent from the waste heat collecting pipe 17b as the external heat transport medium is heat-exchanged with the oxidizer side waste gas by the second heat exchanging means 21, then heat-exchanged by the first heat exchanging means 14 with the internal heat transport medium heat-transferred by the pump 9 of the internal circulation circuit 8, and then sent to the heat utilizing means 39 through the waste heat collecting pipe 17a. For the heat utilizing means 39, a hot water tank is used as the hot water supply system. At this time, since the fuel cell main unit 19 incorporates the second heat exchanging means 21 and the first heat-exchanging means 14, it is possible to construct the system in such a way that the amount of the internal heat transport medium that flows through the internal circulation circuit is reduced compared to the amount of the external heat transport medium (water). When a non-freezing solution is used as the internal heat transport medium, it is possible to reduce the total amount of the non-freezing solution, and therefore construct a more economical system. Furthermore, of the waste heat collecting pipes 17a and 17b, the waste heat collecting pipe 17b from the hot water tank 39 to the second heat exchanging means 21 is the (water) pipe normally on the low temperature side and the temperature of the internal heat transport medium that flows through the internal circulation circuit of the fuel cell 1 is 70 to 80° C. in the case of a polymer electrolyte fuel cell, and therefore it is possible to reduce heat loss compared to the case where the cooling pipe 8 of the internal heat transport medium is extended, and improve the waste heat collection efficiency as the fuel cell.

Furthermore, when there is no need to collect waste heat of the fuel cell 1 through the heat utilizing means 39, in order to dissipate heat generated from the fuel cell 1, the flow rate adjustment valve 15 is left open, the flow rate adjustment valve 16 is closed and the radiator unit 10 is activated, thus making it possible to exchange heat of the internal heat transport medium with external air and dissipate heat to the outside.

Furthermore, the fuel cell cooling water temperature controlling means 42 controls the flow rate of the external circulation pump 31 in such a way that the temperature of the internal heat transport medium supplied to the fuel cell 1 reaches to a predetermined temperature (approximately 70 to 80° C.) based on the hot water temperature detected by the internal heat transport medium thermistor 41 attached to the outlet side of the first heat exchanging means of the internal circulation circuit. That is, by collecting waste heat of the fuel cell 1 into the heat utilizing means 39 according to the amount of electric power generated, it is possible to keep and adjust the temperature of the internal heat transport medium of the fuel cell 1 to a predetermined temperature, also keep the temperature of the fuel cell during low load operation, prevent the fuel cell from being poisoned with carbon monoxide and improve the reliability as the cogeneration apparatus a great deal. In this case, temperature control of the internal heat transport medium is given priority over temperature control of the hot water tank 39. That is, when the temperature of the internal heat transport medium becomes too low, the pump 31 is stopped.

Furthermore, when the amount of waste heat collected from the heat utilizing means 39 is small or collection of waste heat is unnecessary, appropriately adjusting the valve position of the flow rate adjustment valves 15 and 16 makes it possible to dissipate extra heat to the outside through the radiator unit 10, keep and adjust the temperature of the internal heat transport medium thermistor 41 to a predetermined temperature and keep the temperature of the internal heat transport medium to be supplied to the fuel cell 1 to a predetermined temperature.

Furthermore, this embodiment uses water (pure water) or a non-freezing solution as the internal heat transport medium and water (pure water) or non-freezing solution flows into the fuel cell and collects waste heat, and reducing the length of the internal circulation circuit can reduce the possibility of deterioration of water quality or pollution and has the effect of improving the reliability of the cogeneration apparatus using the fuel cell.

This embodiment uses an oxidizer side waste gas of the fuel cell as the heat source of the first heat exchanging means, but similar effects can also be achieved by providing a configuration using the fuel side waste gas of the fuel cell.

INDUSTRIAL APPLICABILITY

As is apparent from the above-described explanations, the cogeneration apparatus of the present invention achieves the following effects.

Incorporating the fuel cell, internal circulation circuit and heat exchanging means in the fuel cell main unit makes it possible to reduce the length of the internal circulation circuit, and use one of the waste heat collecting pipes normally as the pipe on the low temperature side, and thereby reduce heat loss from the waste heat collecting pipe connecting the heat exchanging means and heat utilizing means and improve waste heat collecting efficiency.

Furthermore, reducing the length of the internal circulation circuit makes it possible to reduce the total amount of the internal heat transport medium that flows through the internal circulation circuit and thereby construct a more economical system such as using a non-freezing solution for the internal heat transport medium and using water for the external heat transport medium in the waste heat collecting pipe that connects the fuel cell and heat utilizing means. Furthermore, since the internal heat transport medium flows into the fuel cell and collects waste heat, it is possible to reduce the length of the internal circulation circuit and thereby reduce the possibility of deterioration of water quality and pollution and therefore improve the reliability of the fuel cell.

Furthermore, the heat exchanging means is connected in such a way that heat of the oxidizer side waste gas after chemical reaction of the humidified air as the oxidizing gas supplied to the fuel cell is heat-exchanged first, after heat exchange by the first exchanging means then heat from the internal circulation circuit of the cooling water system of the fuel cell is heat-exchanged by the second heat exchanging means. Thus, heat on the high temperature side is exchanged after heat exchange by the heat exchanging means on the low temperature side, and therefore the heat exchange efficiency improves and the utilization efficiency of waste heat transferred to the heat utilizing means increases significantly.

Furthermore, by using water as the external heat transport medium and using the hot water tank as the heat utilizing means, controlling the flow rate of the external heat transport medium circulating means provided in the path of the waste heat collecting pipe and providing hot water controlling means of storing hot water from the upper part of the hot water tank in a multilayer form, it is possible to always store hot water from the upper part of the hot water tank in a multilayer form, secure high hot water temperature (60 to 80° C.) in a normal piping configuration that takes out the hot water feeding pipe inlet from the upper part of the hot water tank, and secure a minimum necessary amount of hot water to be stored in a short time even if the total amount of the hot water tank is exhausted. Thus, it is possible to obtain hot water at a usable temperature in a short time and further improve convenience compared to the case the temperature of where tankful of water is increased across the board.

Furthermore, when heat produced by power generation of the fuel cell is dissipated to cool the fuel cell by providing the fuel cell cooling water temperature controlling means of adjusting the flow rate of the external heat transport medium circulating means that carries hot water in the waste heat collecting pipes, adjusting the amount of heat exchange from the heat exchanging means and keeping the temperature of the internal heat transport medium which flows into the fuel cell to a predetermined temperature, it is possible to adjust the amount of heat exchange of hot water in the waste heat collecting pipe by the flow rate of the external heat transport medium circulating means, keep the temperature of the internal heat transport medium that enters the fuel cell to a predetermined temperature, operate the fuel cell at a stable temperature, prevent deterioration of performance as a fuel cell due to poisoning with carbon monoxide and construct a cogeneration apparatus with a high degree of reliability.

The invention claimed is:

1. A cogeneration apparatus, comprising:
    a polymer electrolyte fuel cell operable to generate electric power using a fuel gas and an oxidizing gas;
    an internal circulation circuit operable to circulate an internal heat transport medium through said fuel cell;
    an internal circulating unit operable to circulate the internal heat transport medium;
    a waste heat collecting pipe operable to circulate an external heat transport medium;
    a heat exchanging unit operable to exchange heat of the internal heat transport medium circulating inside said internal circulation circuit with heat of the external heat transport medium circulating inside said waste heat collecting pipe;
    a heat utilizing unit operable to utilize heat of the external heat transport medium heat-exchanged by said heat exchanging unit through said waste heat collecting pipe;
    an external heat transport medium circulating unit operable to circulate the external heat transport medium inside said waste heat collecting pipe;
    a temperature detecting unit operable to detect a temperature of said internal heat transport medium; and
    a fuel cell cooling water temperature controlling unit operable to control the temperature of said internal heat transport medium to a predetermined temperature, by adjusting a flow rate of said external heat transport medium circulating unit based on the detected temperature of said internal heat transport medium.

2. The cogeneration apparatus according to claim 1,
    wherein temperature control of the internal heat transport medium is given priority over temperature control of the external heat transport medium by controlling a flow of the external heat transport medium using said external heat transport medium circulating unit.

3. The cogeneration apparatus according to claim 2, wherein
    temperature of the internal heat transport medium represents temperature of the internal heat transport medium after heat exchange in said heat exchanging unit, and
    temperature of the external heat transport medium represents temperature of said external heat transport medium after heat exchange in said heat exchanging unit.

4. The cogeneration apparatus according to claim 2, further comprising:
    a temperature detecting unit operable to detect temperature of the external heat transport medium,
    wherein the temperature control of the internal heat transport medium is by using temperature detected by said temperature detecting unit, and the temperature control of the external heat transport medium is by using temperature detected by said further temperature detecting unit, and
    the temperature control of the internal heat transport medium is given priority by controlling the flow of the external heat transport medium so that the temperature of the internal heat transport medium detected by said temperature detecting unit becomes a predetermined temperature.

5. The cogeneration apparatus according to claim 4, wherein the temperature control prevents the temperature of the internal heat transport medium from falling below the predetermined temperature when there is low load operation.

* * * * *